United States Patent
Sakai et al.

(10) Patent No.: US 10,630,120 B2
(45) Date of Patent: Apr. 21, 2020

(54) AXIAL-AIR-GAP MOTOR AND BOBBIN FOR MOTOR

(71) Applicant: Hitachi Industrial Equipment Systems Co., Ltd., Chiyoda-ku, Tokyo (JP)

(72) Inventors: Toru Sakai, Tokyo (JP); Katsuyuki Yamazaki, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 174 days.

(21) Appl. No.: 15/129,716

(22) PCT Filed: Dec. 19, 2014

(86) PCT No.: PCT/JP2014/083641
§ 371 (c)(1),
(2) Date: Feb. 14, 2017

(87) PCT Pub. No.: WO2015/145901
PCT Pub. Date: Oct. 1, 2015

(65) Prior Publication Data
US 2017/0155290 A1  Jun. 1, 2017

(30) Foreign Application Priority Data

Mar. 28, 2014 (JP) .................. 2014-067458

(51) Int. Cl.
*H02K 3/46* (2006.01)
*H02K 1/18* (2006.01)
*H02K 3/52* (2006.01)

(52) U.S. Cl.
CPC .............. *H02K 1/182* (2013.01); *H02K 3/46* (2013.01); *H02K 3/521* (2013.01)

(58) Field of Classification Search
CPC .... H02K 1/182; H02K 2203/12; H02K 3/521; H02K 3/46
(Continued)

(56) References Cited

U.S. PATENT DOCUMENTS

| | | | | |
|---|---|---|---|---|
| 7,531,937 B2 * | 5/2009 | Kojima | ................. | H02K 1/148 |
| | | | | 310/216.096 |
| 7,569,958 B2 * | 8/2009 | Matsuzaki | ............ | H02K 3/524 |
| | | | | 310/43 |

(Continued)

FOREIGN PATENT DOCUMENTS

| | | |
|---|---|---|
| CN | 101286657 A | 10/2008 |
| CN | 101841193 A | 9/2010 |

(Continued)

OTHER PUBLICATIONS

Extended European Search Report issued in counterpart European Application No. 14887630.3 dated Oct. 27, 2017 (Nine (9) pages).

(Continued)

*Primary Examiner* — Terrance L Kenerly
(74) *Attorney, Agent, or Firm* — Crowell & Moring LLP

(57) ABSTRACT

An axial-air-gap motor integrally configured by resin molding, a plurality of stator cores being arranged in an annular configuration, wherein the resin is spread in an efficient manner. An axial-air-gap motor, provided with: a plurality of stator cores, a stator, and one or more rotors. The stator cores are provided with a teeth iron core having the shape of an approximate trapezoidal cylinder, a bobbin covering at least the vicinity of both end parts of the outer periphery of the teeth iron core, flange parts provided in the vicinity of the portions of the bobbin that cover the both end parts of the outer periphery of the teeth iron core so as to extend for a predetermined length in a direction perpendicular to the outer periphery of the teeth iron core, and at least one protrusion further extending from the tip of the flange part (Continued)

in the direction of extension. The extension-direction tip of each of the protrusions is brought into contact, in the direction of rotation of an output shaft, with the extension-direction end part of the flange part of another stator core, the stator cores being arranged in an annular shape about the axial direction of the output shaft. The stator cores are integrally molded using a resin to form the stator. The one or more rotors are in a planar-faced configuration with the side surfaces of the end part of the teeth iron core, interposed by a predetermined air gap.

10 Claims, 9 Drawing Sheets

(58) Field of Classification Search
USPC .......................................................... 310/43
See application file for complete search history.

(56) References Cited

U.S. PATENT DOCUMENTS

| | | | | |
|---|---|---|---|---|
| 2004/0164641 A1* | 8/2004 | Yamada | ................. | H02K 1/148 310/216.105 |
| 2006/0163964 A1* | 7/2006 | Kojima | ................. | H02K 1/148 310/156.37 |
| 2007/0001534 A1* | 1/2007 | Kojima | ................... | H02K 1/14 310/156.37 |
| 2008/0106161 A1 | 5/2008 | Matsuzaki et al. | | |
| 2010/0231084 A1* | 9/2010 | Kinoshita | .............. | H02K 1/148 310/216.009 |

FOREIGN PATENT DOCUMENTS

| | | |
|---|---|---|
| JP | 56-123746 A | 9/1981 |
| JP | 2004-282989 A | 10/2004 |
| JP | 2008-118833 A | 5/2008 |
| JP | 2009-239986 A | 10/2009 |
| JP | 2010-220288 A | 9/2010 |
| JP | 2013-135541 A | 7/2013 |

OTHER PUBLICATIONS

Wei, "4 Stator Design," Mechanical Design of Motors, Jan. 31, 2014, CRC Press, Boca Raton, London, New York, pp. 219-257, XP055416001 (Thirty-Nine (39) pages).

Japanese-language Office Action issued in counterpart Japanese Application No. 2016-509915 dated Jul. 18, 2017 with English translation (8 pages).

Chinese-language Office Action issued in counterpart Taiwan Application No. 104103613 dated Dec. 28, 2015 with English translation (12 pages).

International Search Report (PCT/ISA/210) issued in PCT Application No. PCT/JP2014/083641 dated Mar. 31, 2015 with English translation (6 pages).

Japanese-language Written Opinion (PCT/ISA/237) issued in PCT Application No. PCT/JP2014/083641 dated Mar. 31, 2015 (5 pages).

Chinese-language Office Action issued in counterpart Chinese Application No. 201480078562.6 dated May 14, 2018 with English translation (15 pages).

\* cited by examiner

ND BOBBIN FOR
AXIAL-AIR-GAP MOTOR AND BOBBIN FOR MOTOR

TECHNICAL FIELD

The present invention relates to axial-air-gap motors and bobbins for motor, and particularly, to an axial-air-gap motor including a bobbin configuring a stator, and a bobbin for the motor.

BACKGROUND ART

For promoting the high efficiency of motors, there is known a permanent magnet (PM) motor that adopts a rare metal (rare earth) such as a neodymium magnet as a magnetic body. Use of the rare metal raises various problems including prices due to scarcity.

In this respect, there are known various motors that can obtain sufficient characteristics by effectively using a ferrite magnet not using the rare metal.

The motor prevailing at present is configured of a radial-air-gap motor with an air gap in the same direction with an output shaft, but in this configuration, the ferrite magnet is required to be arranged along a rotational direction of the output shaft, and it is necessary to increase a volume of the ferrite magnet for obtaining the same performance with the neodymium magnet. As a result, the motor becomes large in size.

As to a motor that secures performance and prevents the motor from growing in size, there is known an axial-air-gap motor as disclosed in Patent Literature 1, for example. The axial-air-gap motor is configured such that a magnet is arranged largely in a radial direction vertical to an output shaft direction. Therefore, the length of the motor in the output shaft direction is made short, that is, a so-called flattened motor is made possible, thus preventing the motor from growing in size.

Here, a stator of the axial-air-gap motor disclosed in Patent Literature 1 is configured as follows. First, an insulator (bobbin) is provided on the periphery of a teeth iron core having a shape of an approximately trapezoidal cylinder to be integral therewith by resin molding, and a coil is wound around the insulator to obtain a plurality of pole members. Thereafter, the plurality of pole members are arranged without a gap in an annual shape (in a donut shape) pointing the cylindrical teeth toward the rotational shaft direction, and finally, all the pole members arranged in the annual shape are molded as a whole by insert molding of resin to form the annually integrated stator.

Patent Literature 2 discloses a stator in an axial-air-gap motor having the approximately same configuration with Patent Literature 1. This stator can be produced by, for lining up a plurality of pole members in an annual shape, providing a hook portion for connection to an insulator of the adjacent pole member in one corner of an end part in an insulator in an inner diameter side, providing a hook groove portion for engaging to a hook portion provided in an opposite adjacent pole member in the other corner part, connecting the insulators in close contact with each other without a gap, and thereafter, resin-molding the entire pole members.

CITATION LIST

Patent Literature

PATENT LITERATURE 1: JP-A-2004-282989
PATENT LITERATURE 2: JP-A-2008-118833

SUMMARY OF INVENTION

Technical Problem

Incidentally, the resin molding of the stator cores and the pole members lined up in the annual shape is performed for the following reason. That is, this is because insulation between the laminated cores and the wire-winding part is securely performed and an insulation configuration that can fix the wire winding part for preventing the wound coil from collapsing is necessary.

In this respect, in the stators disclosed in Patent Literatures 1 and 2, the adjacent pole members are connected in close contact with each other, and have only limited inlets for intrusion of resins in narrow portions and portions of complicated flow passage shapes, such as between the respective coils. Therefore, there is a possibility that the resins do not get around sufficiently.

It can be said that this problem can be solved by increasing a pressure of the resin to be press-fitted, but in some cases the high pressure causes the transfer of each of the stator cores, possibly disturbing the array or the resins do not get around sufficiently even by resin filling by the high pressure. The disturbance of the array brings in contact of the coils each other or unbalance of magnetic flux, possibly affecting performance or reliability of the motor remarkably. In general, the filling pressure or the amount of the resin is made larger according to growing in size of the motor, leading to a more serious problem.

For overcoming the disturbance of the annual array due to the press-fitting by the high pressure, it is conceived to increase the strength of the insulator or hook disclosed in Patent Literature 1 or 2. However, if the thickness or configuration corresponding to the strength increase is secured, a cost increase, relatively growing in size of the bobbin and finally extension of a shaft length of the motor will be induced.

It is desired to perform the resin molding efficiently at the resin filling.

Solution to Problem

For solving the aforementioned problems, for example, the configuration defined in claims is applied. That is, an axial-air-gap motor comprises:

a plurality of stator cores each including; a teeth iron core having a shape of an approximate trapezoidal cylinder, a bobbin covering at least the vicinity of both end parts of the outer periphery of the teeth iron core, flange parts provided in the vicinity of the portions of the bobbin that covers both the end parts of the outer periphery of the teeth iron core so as to extend by a predetermined length in a direction perpendicular to the outer periphery of the teeth iron core, and at least one protrusion further extending from a tip of the flange part in the extension direction;

a stator that is formed by integrally molding the plurality of stator cores by a resin, the stator cores being configured such that the extension-direction tip of the at least one protrusion in the flange part of the one stator core is brought into contact, in a rotational direction of an output shaft, with an end part of the flange part in the other stator core in the extension direction and being arranged in an annual shape about an axial direction of the output shaft; and one or more of rotors that are in a planar-faced configuration with the side surfaces of the end part of the teeth iron core, interposed by a predetermined air gap.

Advantageous Effects of Invention

According to one aspect of the present invention, it is possible to obtain the axial-air-gap motor with the resin molded stator in which an air gap is formed between the respective stator cores arranged in the annual shape and the resin is sufficiently filled into the narrow spaces.

Other problems or effects of the present invention will be apparent from the following descriptions.

DESCRIPTION OF EMBODIMENTS

Hereinafter, the details of an axial-air-gap motor 1 according to an embodiment to which the present invention is applied will be explained with reference to the drawings.

First Embodiment

Figure 1:
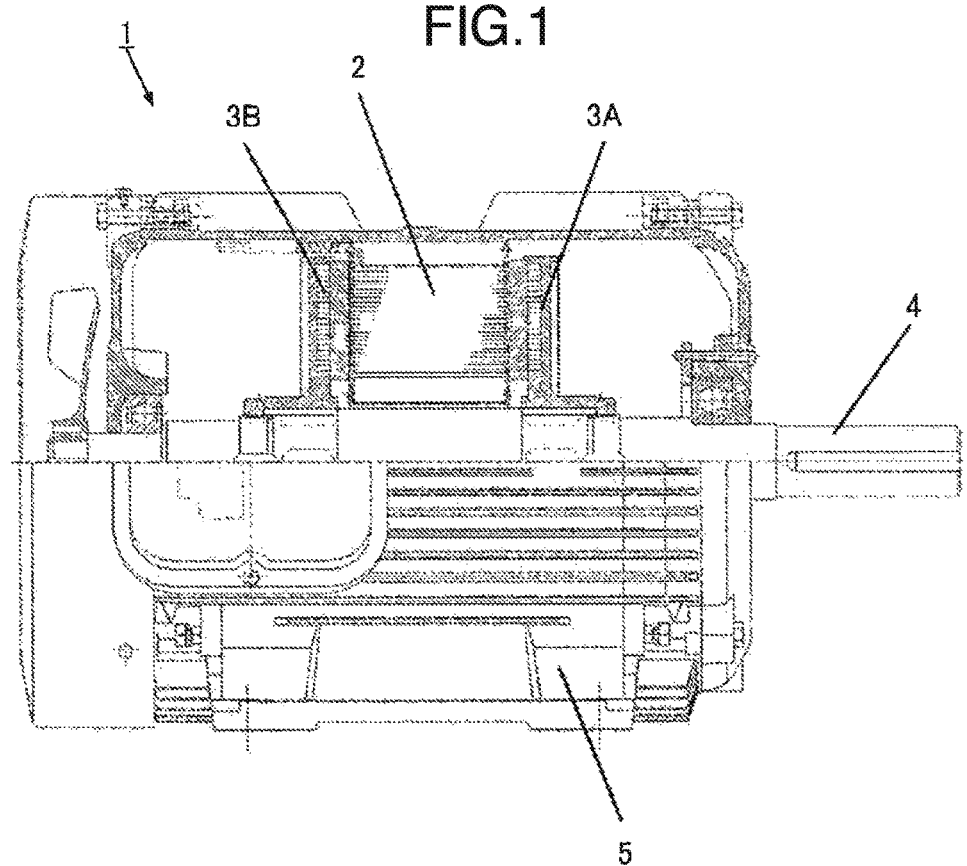
FIG. 1 is a partial side cross section illustrating a schematic configuration of an axial-air-gap motor according to an embodiment to which the present invention is applied.
Figure 2:
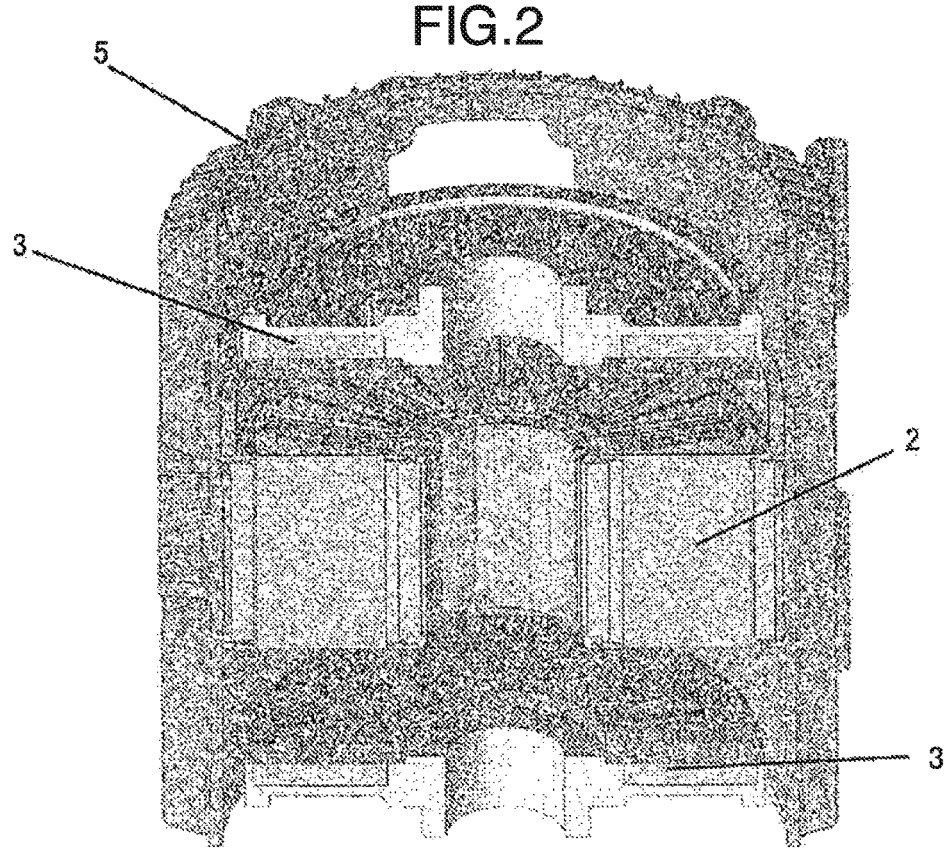
FIG. 2 is a perspective view schematically illustrating a partial configuration of the axial-air-gap motor in the present embodiment.

FIG. 1 illustrates a partial side cross section of the axial-air-gap motor 1 according to a first embodiment. FIG. 2 illustrates a schematic diagram partially expressing only the configuration of a stator 2 and rotors 3A, 3B arranged respectively on two faces opposing the stator 2 in the axial-air-gap motor 1.

The axial-air-gap motor 1 is provided with the stator 2 arranged in an annual shape about a shaft line of an output shaft 4 of the motor and a pair of the rotors 3A, 3B arranged to be opposed with a predetermined air gap on both surfaces of the stator 2 in the output shaft direction.

The stator 2 has, as illustrated in FIG. 2, a plurality of stator cores 6 in an approximately trapezoidal cylindrical shape (12 pieces and 12 slots in the present embodiment). Because of securing the strength of the annually arranged stator cores 6 each other, insulation between the adjacent coils, and the like, all the stator cores 6 are resin-molded to be covered with a resin, so that the stator 2 is configured integrally. Further, at the resin molding of the stator 2, one molding die (unillustrated) is inserted in a housing 5 having an inner diameter in an approximately cylindrical shape, and the stator cores 6 are arranged in an annual shape in a predetermined position of the molding die. Thereafter, the other molding die is inserted in the housing 5 from an opposite opening thereof to fill the resin therein. The stator 2 is molded and at the same time, an outer peripheral surface of the stator 2 is supported and fixed directly on an inner peripheral surface of the motor housing 5 by resin molding.

The molding method is not limited thereto, and only the stator 2 may be formed by integral molding separately outside of the housing 5. In this case, it is conceived to fix the stator 2 to the housing 5 by bolts or the like from inside or outside of the housing 5.

Figure 3A:
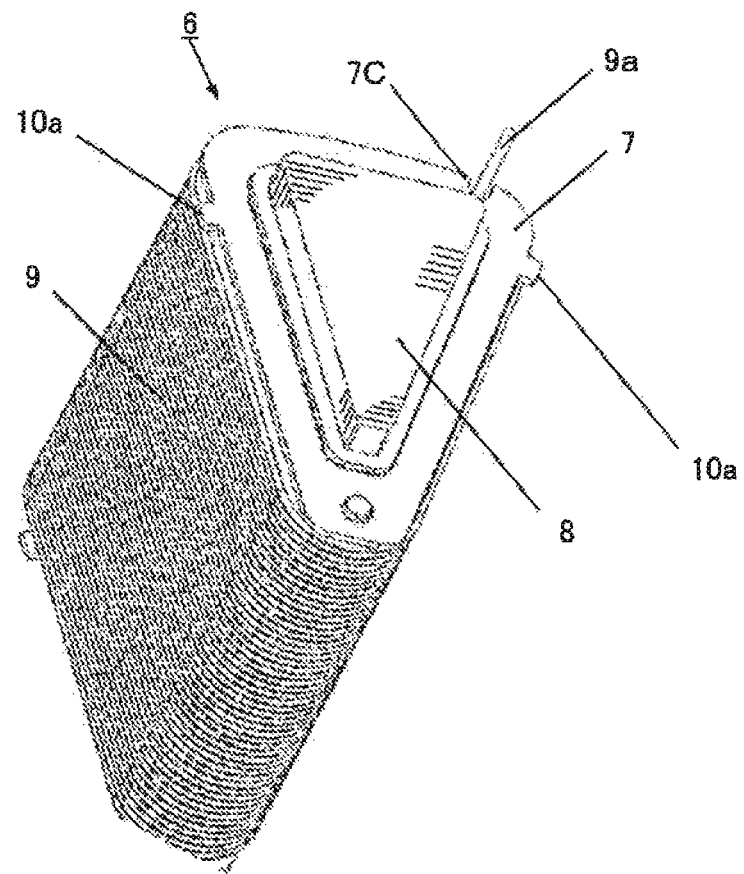
FIG. 3A is a perspective view schematically illustrating an outline configuration of a stator core in the present embodiment.
Figure 3B:
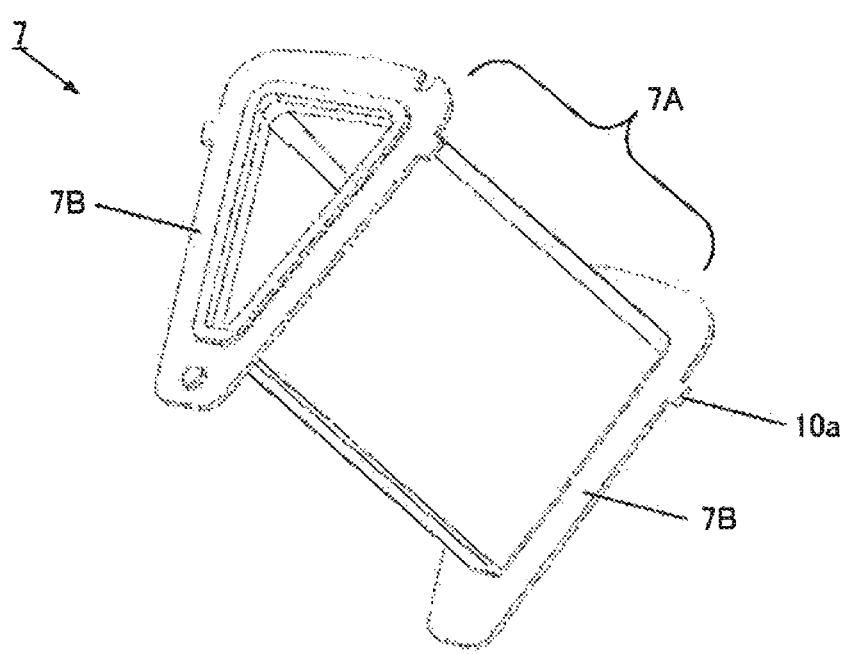
FIG. 3B is a perspective view schematically illustrating an outline configuration of a bobbin in the present embodiment.
Figure 4A:
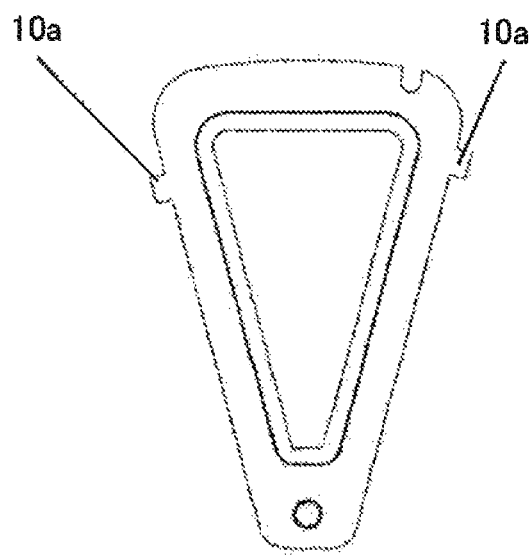
FIG. 4A is a schematic front view illustrating a flange part of a bobbin in a first embodiment.
Figure 4B:
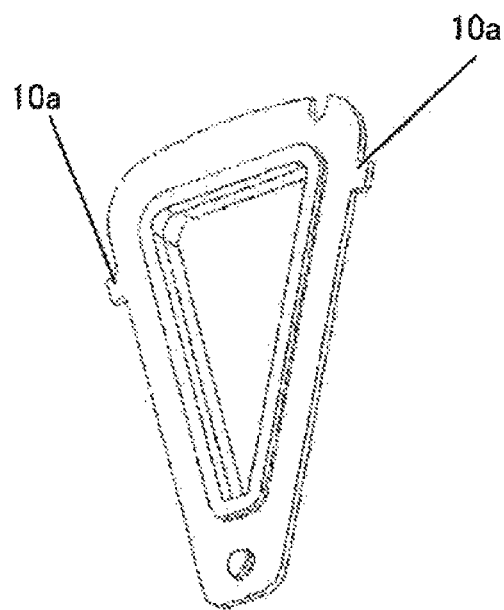
FIG. 4B is a perspective view thereof.
Figure 4C:
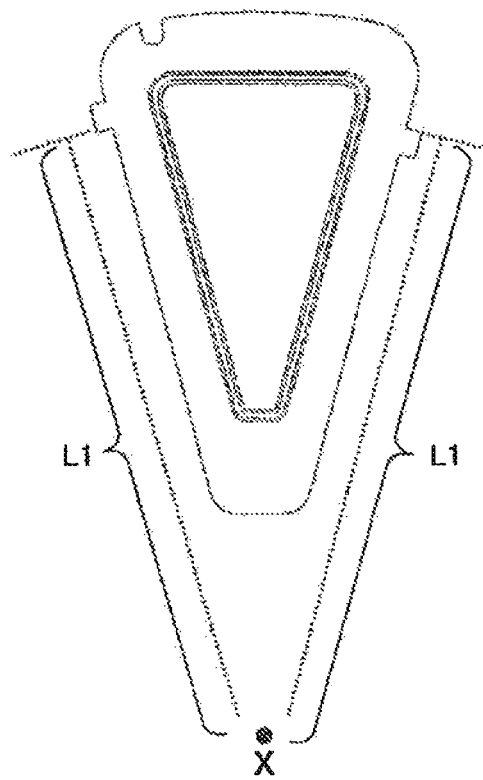
FIG. 4C is a schematic backside view illustrating the flange part of the bobbin in the first embodiment.
Figure 4D:
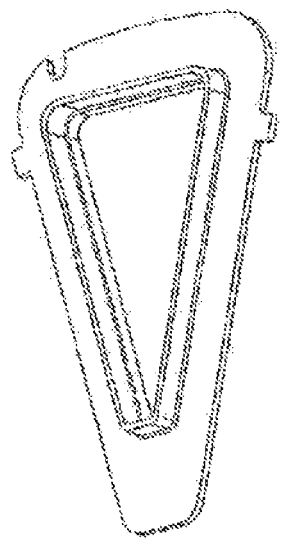
FIG. 4D is a perspective view thereof.

FIG. 3($a$) schematically illustrates the configuration of the stator core 6. The stator core 6 includes at least a bobbin 7, a laminated iron core 8 and a coil 9.

The laminated iron core 8 is an iron core having a shape of an approximate trapezoid or a triangle pole formed by radially and in turn laminating metallic plates molded in such a manner that the width gradually increases. A cross-sectional shape of the iron core may include a cross section having two oblique sides having an intersection point in the extension direction other than the approximate trapezoid or triangular shape.

The metallic plate may be composed of an iron or the like, but in the present embodiment, metals containing amorphous are laminated, the metal being formed as a thin plate in a tape shape and having a width in the rotational direction made larger in turn, thereby producing the laminated iron core 8.

The present invention is not limited to the laminated iron core, and may be an iron core by casting or powder compacting.

FIG. 3($b$) schematically illustrates the configuration of the bobbin 7. The bobbin 7 is composed of a body part 7A in a trapezoidal cylindrical shape having an inner cylindrical part of an inner diameter approximately in agreement with the shape of the outer periphery of the laminated iron core in the trapezoidal pole shape and flange parts 7B provided on both end parts of the body part 7A and extending by a predetermined length over an entire peripheral direction perpendicular to an outer cylindrical part of the body part 7A. The body part 7A has an inner diameter approximately identical to or slightly larger than an outer diameter of the laminated iron core 8, and has the length for being capable of covering the vicinity of both end parts of the outer periphery (that is, both end parts in the extension direction of the output shaft 4 on the outer periphery) of the laminated iron core 8 upon inserting the laminated iron core 8. The bobbin 7 can be composed of various materials as long as the insulation between the coil and the iron core is secured, but is generally provided by resin molding. Also in the present embodiment, the bobbin 7 is made of the resin.

A notch 7C is to extract an extraction line 9a of the coil.

The stator core 6 is configured by inserting the laminated iron core 8 in the inner diameter side of the body part 7A in the bobbin 7 and winding the coil 9 around the outer periphery of the body part 7A and between the flange parts 7B in both the end parts of the body part 7A. In the present embodiment, the coil 9 is wound to the extent approximately identical to a predetermined length in the rotational direction of the flange part 7B, but the present invention is not limited thereto.

The flange part 7B of the bobbin 7 has one protrusion 10a that is one of the features in the present embodiment in each of both end parts in the rotational direction.

Figure 5A:
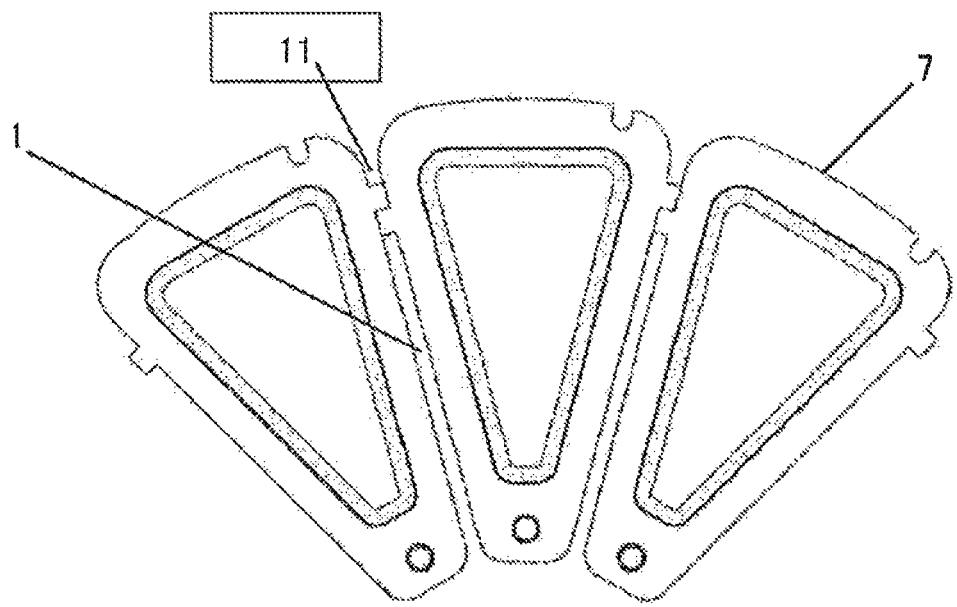
FIG. 5A is a schematic front view illustrating a state where the bobbins are arranged to be adjacent to each other in the first embodiment.
Figure 5B:
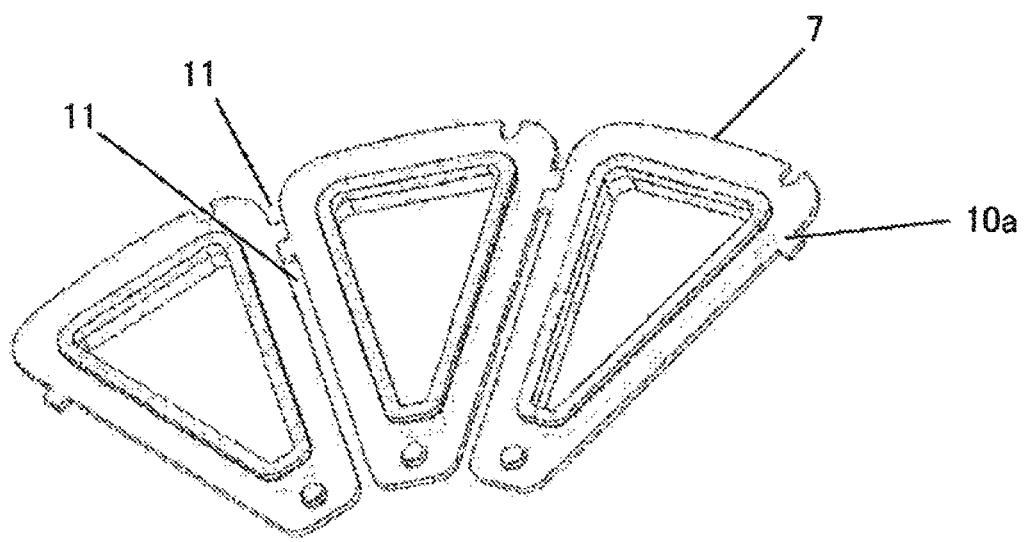
FIG. 5B is a perspective view thereof.
Figure 6:
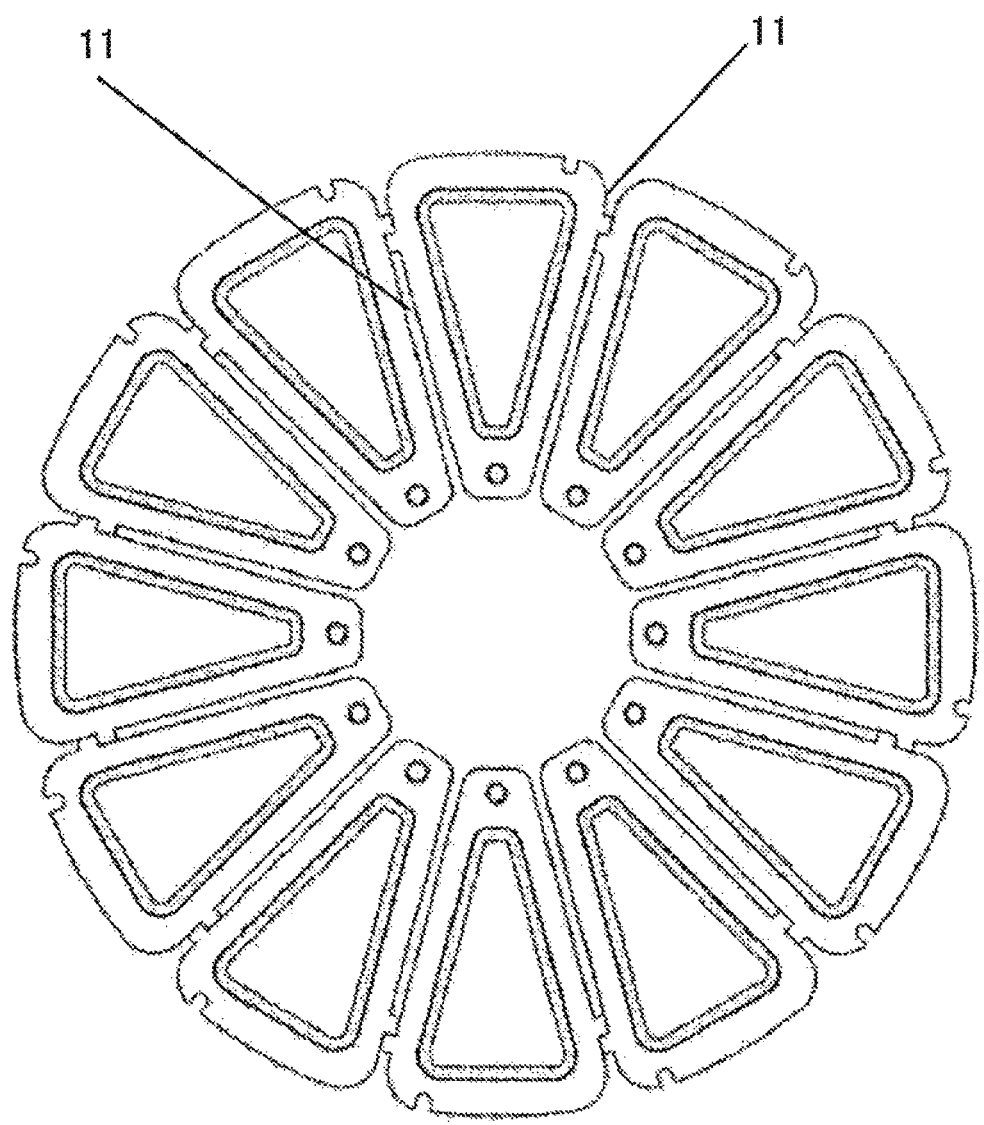
FIG. 6 is a schematic diagram illustrating a state where the bobbins are arranged in an annual shape in the first embodiment.

FIGS. 4, 5 and 6 illustrate mainly the configuration of the flange part 7B alone in the bobbin 7. As illustrated in a front view of FIG. 4(a), in a front perspective view in FIG. 4(b), in a backside view in FIG. 4(c) and in a backside perspective view in FIG. 4(d), the protrusions 10a extend by a predetermined length in the rotational direction on side end parts of the flange part 7B in the rotational direction and are respectively provided in positions spaced by different distances radially from the output shaft 4. Specifically as illustrated in FIG. 4(c), the protrusions 10a are arranged in a relation that a distance (L1) from an axial direction side face of one protrusion 10a to a shaft core X is as approximately equal as a distance (L1) from a side face of the other protrusion 10a in a direction opposing the axial direction to the shaft core X. Therefore, when the stator core 6 are arranged in an annual shape, a side surface of one protrusion 10a of the stator core 6 is radially engaged to a side surface of the other protrusion 10a of the adjacent stator core 6. In the present embodiment, since the radial widths of the protrusions 10a are all equal, the one protrusion 10a is provided in a position radially shifted by a radial width of the other protrusion 10a on the side end part of the flange part 7B in the rotational direction.

According to this configuration, as illustrated in FIGS. 5(a), 5(b), when the stator cores 6 are arranged in the annual shape, the protrusion 10a makes contact with the side end part of the flange part 7B in the adjacent bobbin 7, and thereby, a gap 11 is formed between the stator cores 6 each other. In addition, when the protrusions 10a are radially engaged to each other, a radial shift of the stator cores 6 each other is suppressed. That is, as illustrated in FIG. 6, when all the stator cores 6 are arrayed in the annual shape, the engaged protrusions 10a respectively generate stress against the radial shifts of the protrusions 10a in all the stator cores 6 with each other.

The gaps 11 thus formed enable securing an insulating distance between the adjacent stator cores 6 each other and securing flow passages that cause resins filled from the upward side (and/or the downward side) of the stator cores 6 arrayed in the molding die to go around between the respective stator cores 6 (particularly, between the coils 9). The engagement of the protrusions 10a each other enables prevention of the shift of the stator cores 6 each other due to pressures at the resin filling.

As described above, according to the first embodiment, the protrusions 10a arranged in the bobbin 7 arrayed in the annual shape supplement the radial transfer positions of the stator cores 6, which secures the positioning of the stator cores 6 and prevents the disturbance of the array of the stator cores 6 at the resin molding, and further causes the gap formed between flanges of the bobbin 7 to effectively function as the flow passage of the resin, as a result bringing in an effect that even in a large volume of the resins, the resin mold formation can be accurately and efficiently performed.

Second Embodiment

The second embodiment is an example characterized in that a plurality of protrusions 10b are respectively provided on each of both end parts of the bobbin flange part 7B in the rotational direction.

Figure 7A:
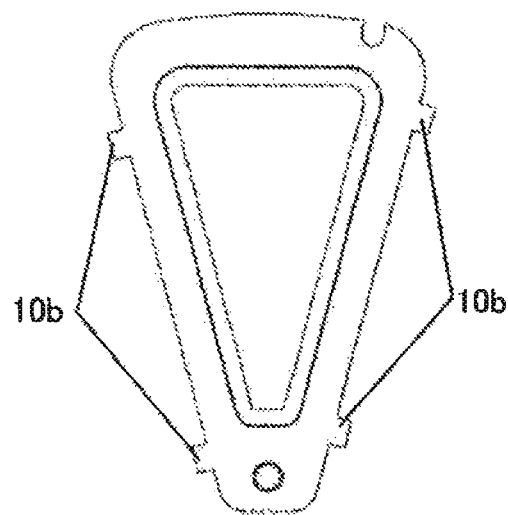
FIG. 7A is a front view schematically illustrating a flange part of a bobbin in a second embodiment of the present invention.
Figure 7B:
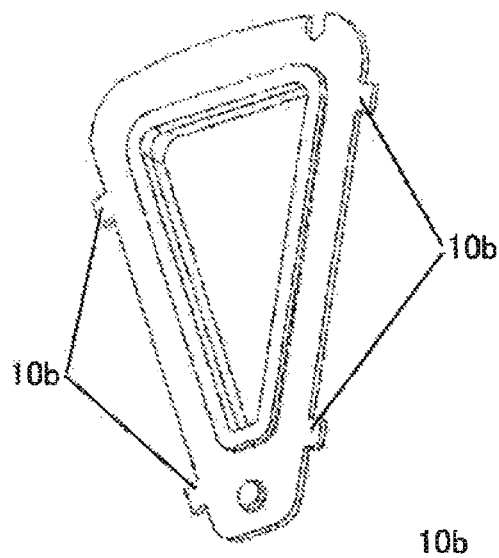
FIG. 7B is a perspective view thereof.
Figure 7C:
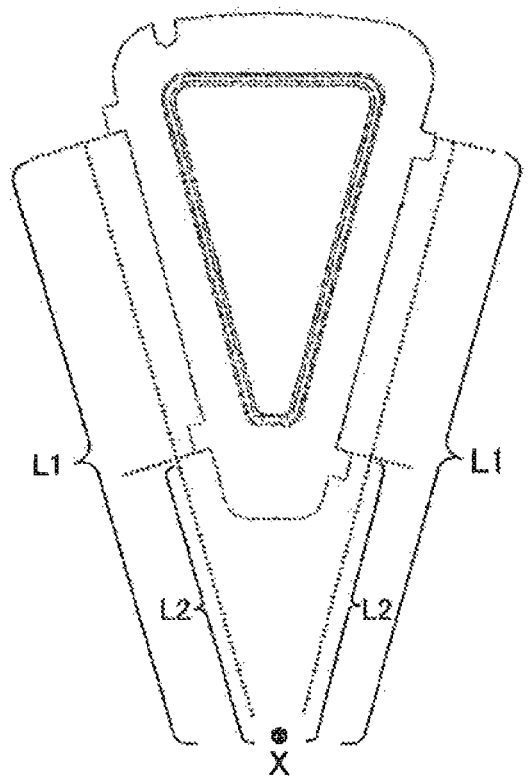
FIG. 7C is a schematic backside view illustrating the flange part of the bobbin in the second embodiment.
Figure 7D:
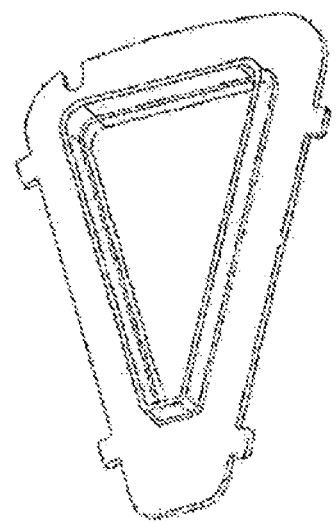
FIG. 7D is a perspective view thereof.
Figure 8A:
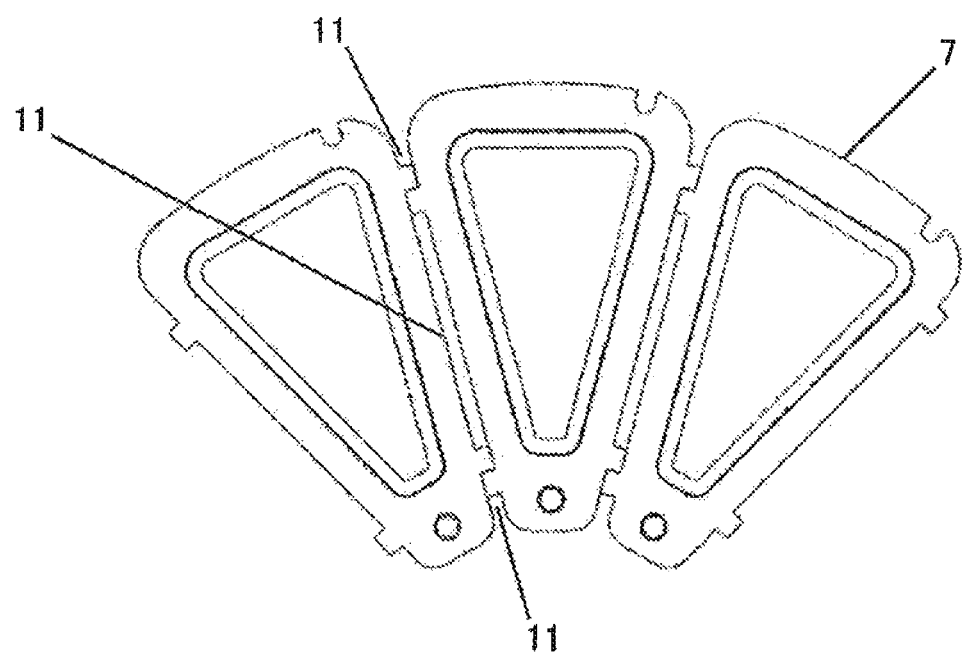
FIG. 8A is a schematic front view illustrating a state where the bobbins are arranged to be adjacent to each other in the first embodiment.
Figure 8B:
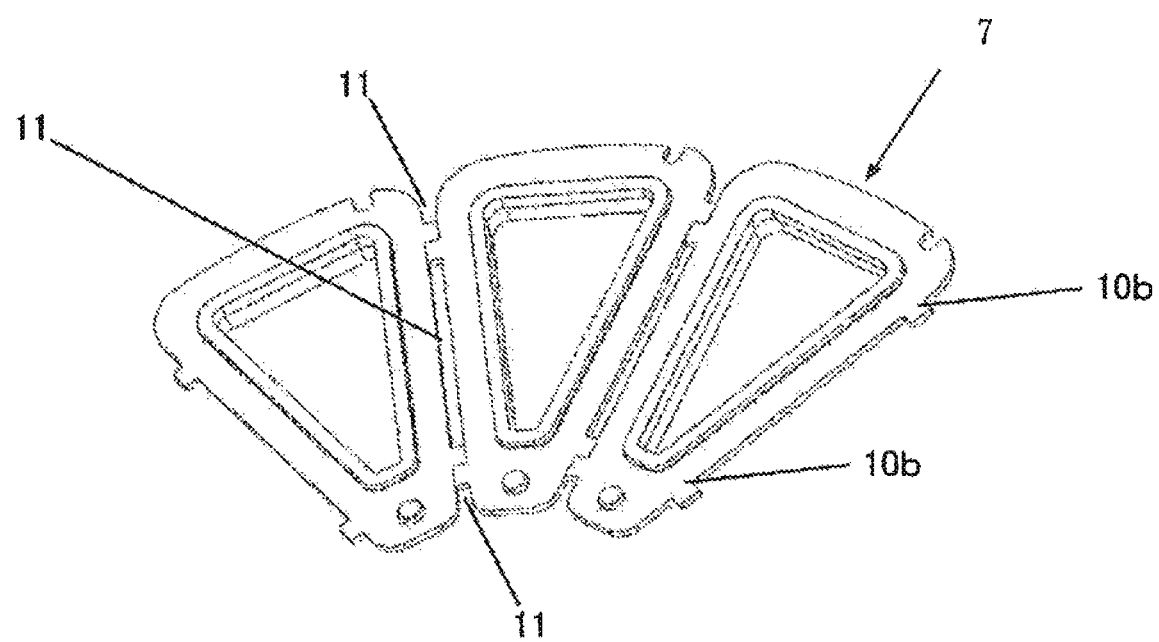
FIG. 8B is a perspective view thereof.

FIGS. 7(a) to 7(d) illustrate a portion of the flange part 7B alone in the second embodiment. As illustrated in a front view of FIG. 7(a), in a front perspective view in FIG. 7(b), in a backside view in FIG. 7(c) and in a backside perspective view in FIG. 7(d), two protrusions 10b are provided on each of both end parts of the flange part 7B in the rotational direction. The respective protrusions 10b extend by a predetermined length in the rotational direction on side end parts of the flange part 7B in the rotational direction and are respectively provided in positions spaced by different distances radially from the output shaft 4. Specifically as illustrated in FIG. 7(c), the protrusions 10b are arranged in a relation that a distance L1 from an axial direction side face of the protrusion 10b in a radial outside of the left side in the drawing to a shaft core X is as approximately equal as a distance L1 from a side face of the protrusion 10b in the radial outside of the right side in the drawing at the opposite to the axial direction to the shaft core. The left and right protrusions 10b in the shaft core side are arranged in the same way (L2).

Therefore, when the stator core 6 are arranged in the annual shape, a side surface of one protrusion 10b of the stator core 6 is radially engaged to a side surface of the other protrusion 10b of the adjacent stator core 6. In the present embodiment, since the radial widths of the protrusions 10b are all equal, the one protrusion 10b is provided in a position radially shifted by a radial width of the other protrusion 10b on the side end part of the flange part 7B in the rotational direction.

For example, in a case of a motor having a stator of a large outer diameter at the center of the axis line of the output shaft, it is estimated that the strength possibly becomes insufficient when one projection of the flange part 7B is provided in each of the left and right sides. Further, in some cases the filling pressure of the resin to be filled at the molding is greater, and therefore, providing one protrusion of the flange part 7B in each of the left and right sides is estimated to be not enough for preventing the shift of the stator core 6. Therefore, providing protrusions in plural locations can more certainly realize the strength securement and the shift prevention at the molding.

The number of the protrusions 10b may differ between the left and right sides (for example, two protrusions on the one side and one or three protrusions on the other side). In the second embodiment, the two left and right protrusions 10b are radially shifted by the radial length of the other protrusion 10b, but a relation between both the left and right protrusions 10b on the shaft core side and on the outer peripheral side may be reversed. That is, when the stator cores 6 are arranged in the annual shape, the two protrusions 10b on the one end part of the flange part 7B may be arranged between the two protrusions 10b on the other end part of the flange part 7B in the adjacent stator core 6 (or in reverse thereto). In this case, it can be expected that the respective protrusions 10b generate the stress against the shift in both of the shaft core side and the outer peripheral side.

[Modification of Protrusion]

In the first and second embodiments, the number and positions of the protrusions have been mainly explained, but hereinafter, an explanation will be made of modifications in regard to the form where protrusions are radially not engaged with each other or the form of the other engagement.

FIGS. 9(a) to 9(e) illustrate the configurations of protrusions in modifications. Each drawing is a schematic diagram partially expressing opposing flange parts 7B in the adjacent stator cores 6 and protrusions provided on end parts of the flange parts 7B in the rotational direction from the output shaft direction.

Figure 9A:
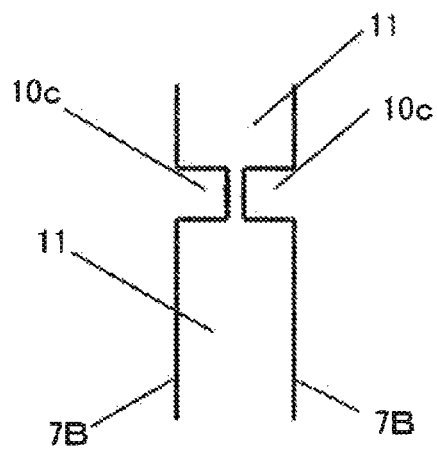
FIGS. 9A to 9E are front views schematically illustrating modifications to the projection in the present embodiment.

FIG. 9(a) illustrates an example in which the protrusions 10c of the adjacent stator cores 6 each are provided in a position of an equal distance radially from the output shaft on the end part of the flange part 7B in the rotational direction. In a case where the radial shift of the stator cores 6 each other does not raise a problem, it is possible to relatively easily realize the configuration of securing the gap 11 for filling the resin. Further, since head crown parts of the protrusions 10c make contact with each other, when the width of the gap 11 is the same, since it is possible to make the length of the protrusion 10c in the rotational direction shorter than the protrusions 10a, 10b in the first and second embodiments (half the length or the like), the strength of the protrusion itself can be expected to improve corresponding to the shortened amount.

Figure 9B:
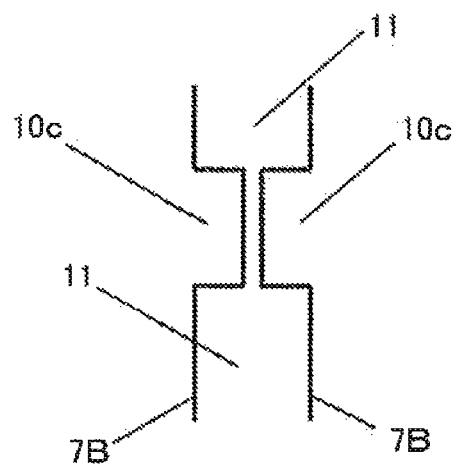

As illustrated in FIG. 9(b), the radial length of the protrusion 10c itself may be made longer than that of the protrusion 10a or 10b in the first and second embodiments. In this case, a radial frictional force generated between the respective head crown parts of the contacted protrusions 10c also increases, and therefore it is possible to further expect a strength increase of the stator 2 after the molding, prevention of the radial shift of the stator cores 6 each other at the resin filling, and the like.

Figure 9C:
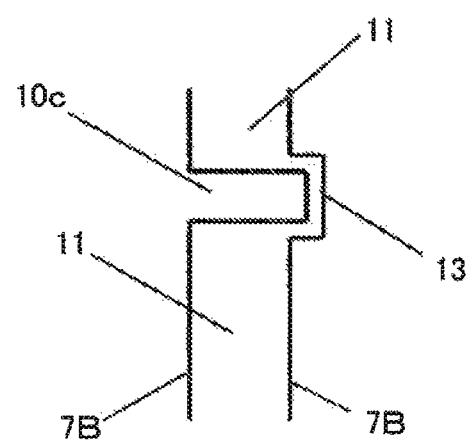
Figure 9D:
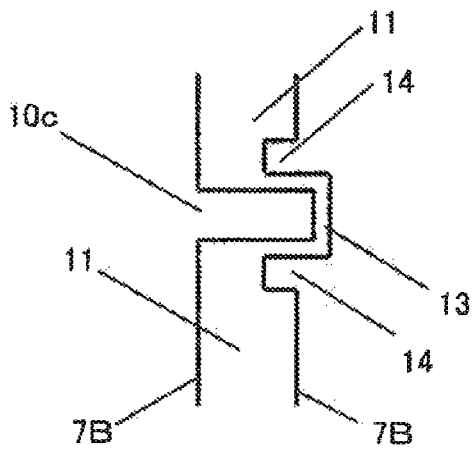
Figure 9E:
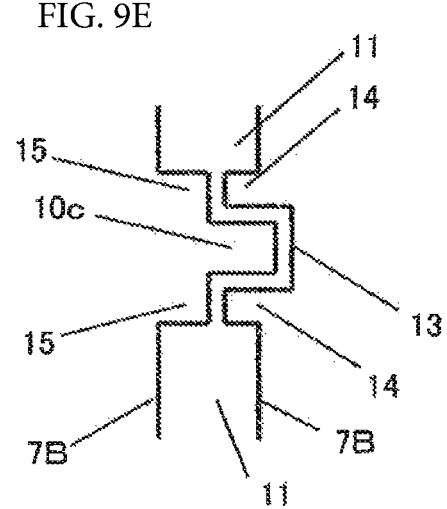

FIGS. 9(c) to 9(e) illustrate, as one of the features, the configuration that the flange part 7B of one stator core 6 is provided with a protrusion 10c, and the flange part 7B of the other stator core 6 opposing it is provided with a concave part 13 radially engaging to the protrusion 10c. The protrusion 10c is coupled to be fitted in the concave part 13, and thereby, one protrusion 10c generates stress against shifts in both of the axial direction and the outer peripheral direction of the stator core 6. Therefore, it is possible to obtain the furthermore shift preventive effect and strength securement effect by the stator core.

Particularly, the examples in FIGS. 9(d) and 9(e) are provided with extension parts 14 in the rotational direction at both sides of the concave part 13 in the radial direction. It can be expected to furthermore support the coupling or the engagement between the protrusion 10c and the concave part 13 by the extension parts 14.

Further, the example in FIG. 9(e) is provided with protrusion support parts 15 that make a root side of the protrusion 10c radially longer than a tip of the protrusion 10c. In a case where it is necessary to make a clearance of the gap 11 longer, it can be expected that the strength of the protrusion 10c is secured further.

Figure 10A:
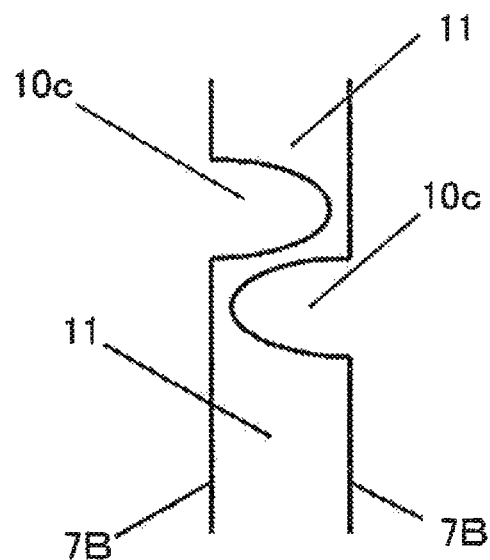
FIGS. 10A to 10C are front views schematically illustrating other modifications to the projection in the present embodiment.
Figure 10B:
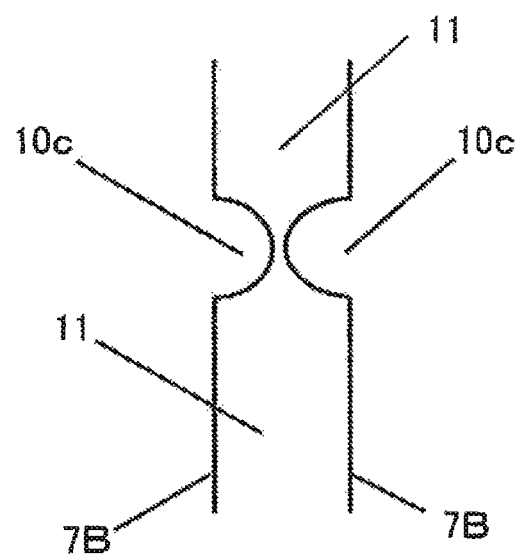
Figure 10C:
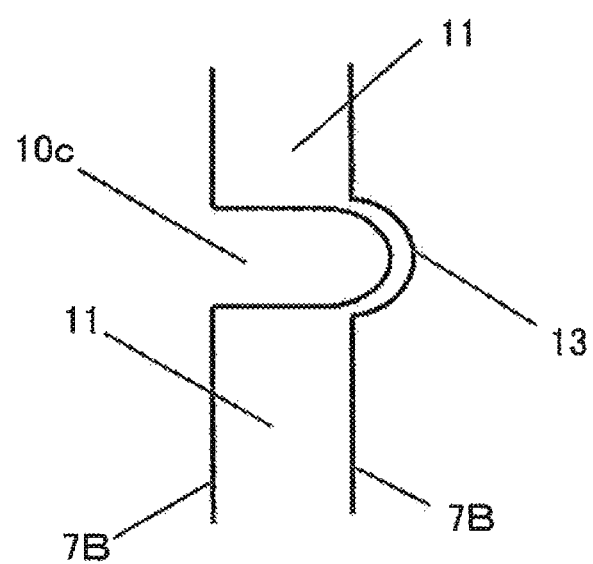

FIGS. 10(a) to 10(c) illustrate other examples of a shape of a protrusion 10c and a concave part 13 themselves. The protrusion 10c and the like may be formed in an approximately circular shape. These example can essentially obtain the effects similar to those in the respective examples illustrated in FIG. 9, and can further expect the effect of an improvement on safety or the like in part dealing because of no edge.

Finally, an explanation will be made of a method for manufacturing the bobbin 7 of the present embodiment. In the aforementioned embodiment, the bobbin 7 is produced by ejection molding of the resin into the molding die, but can be also obtained by laminate-molding the bobbin 7 itself or the molding die itself for ejection-molding the bobbin 7 by a resin by a three-dimensional molding machine or by cutting the bobbin 7 itself or the molding die itself by a cutting RP device.

As to the laminated mold, an optical molding system, a powder sintered laminated molding system, an inkjet system, a resin dissolved laminated system, a plaster powder system, a sheet molding system, a film transfer image laminated system, a metal optical mold complex work system and the like can be applied.

Data for the above laminated mold or for cutting work are generated by processing three-dimensional data generated by a CAD, CG software or a three-dimensional scanner to NC data by a CAM. The above data are input to the three-dimensional molding machine or the cutting RP device to perform three-dimensional molding. The NC data may be generated directly from three-dimensional data by CAD/CAM software.

As a method for obtaining the bobbin 7 or the resin ejection molding die thereof, a data provider or a servicer that has generated three-dimensional data or NC data can deliver it in a predetermined file format through a communication line such as the Internet, a user downloads the data to a three-dimensional molding machine or a computer or the like controlling it or accesses to the data as a cloud type service, and the data are molded/output by the three-dimensional machine, thereby making it possible to manufacture the bobbin 7. A data provider can record three-dimensional data or NC data on a non-volatile recording medium and provide the data to a user.

According to one aspect of the bobbin 7 in the present embodiment by this manufacturing method, there is a method for manufacturing bobbins for a motor stator, the bobbins being arranged in an annual shape by opposing two oblique sides of a teeth iron core having a side cross-sectional surface in an approximate trapezoidal shape to each other and pointing an upper base side thereof at the center, wherein the bobbin is manufactured by a three-dimensional molding machine, based upon three-dimensional data that includes an inner cylindrical part having an inner diameter approximately in agreement with an outer peripheral shape of the teeth iron core for inserting teeth iron core therein, an outer cylindrical part around which a coil is wound along and on an outer periphery of the teeth iron core, and a convex part that extends by a predetermined length in an opposing direction of the two oblique sides from a peripheral surface of the outer cylindrical part and at least a part of which is longer than the laminated thickness of the coil.

Further, according to another aspect, there is a method for manufacturing bobbins for a motor stator, the bobbins being arranged in an annual shape by opposing two oblique sides of a teeth iron core having a side cross-sectional surface in an approximate trapezoidal shape to each other and pointing an upper base side thereof at the center, wherein the method transmits and delivers three-dimensional data that includes an inner cylindrical part having an inner diameter approximately in agreement with an outer peripheral shape of the teeth iron core for inserting the teeth iron core therein, an outer cylindrical part around which a coil is wound along and on an outer periphery of the teeth iron core, and a convex part that extends by a predetermined length in an opposing direction of the two oblique sides from a peripheral surface and at least a part of which is longer than the laminated thickness of the coil.

As described above, the embodiments for carrying out the present invention have been explained, but the present invention is not limited to the above-mentioned various configurations. For example, in the present embodiment, the description has been made of the example in which the bobbin 7 includes mainly the body part 7A and the flange parts 7B, but the body part 7A may be configured to be divided in the vicinity of the center in the axial direction or may be configured to be axially remarkably short, for example, almost of the flange part 7B only, as illustrated in the partial schematic diagram of the flange part 7B in FIG. 4. In this case, the outer periphery of the laminated iron core 8 is preferably insulated from the coil 9 by application of a tape or paint for insulation thereon. In addition, when an insulating agent applied on the coil outer surface has higher insulating performance, the insulating tape or like is not necessarily used.

In the present embodiment, both the end parts of the bobbin 7 in the output shaft direction are provided with the protrusions, but the protrusions may be provided only on the flange part in one end part in the output shaft direction to form the air gap 11.

In the present embodiment, the protrusions 10a, 10b or 10c are used for securing the air gap 11, but in a case where the convex part is formed by making a rotational-direction length of a part of the flange part 7B longer, it can be said that the convex part is equivalent to the protrusion 10a, 10b or 10c.

REFERENCE SIGNS LIST

1 AXIAL-AIR-GAP MOTOR
2 STATOR
3 ROTOR
4 OUTPUT SHAFT
5 HOUSING
6 STATOR CORE
7 BOBBIN
7A BODY PART
7B FLANGE PART
7C NOTCH
8 LAMINATED IRON CORE
9 COIL
9a EXTRACTION LINE
10a, 10b, 10c PROTRUSION
11 GAP
13 CONCAVE PART
14 EXTENSION PART
15 PROTRUSION SUPPORT PART

The invention claimed is:

1. An axial-air-gap motor comprising:
a plurality of stator cores each including:
a teeth iron core having a shape of a pillar, and
a bobbin covering at least a vicinity of both end parts of the outer periphery of the teeth iron core, the bobbin having flange parts provided in a vicinity of the portions of the bobbin that cover both the end parts of the outer periphery of the teeth iron core so as to extend by a predetermined length in a direction perpendicular to the outer periphery of the teeth iron core, and at least one protrusion having a rectangular shape further extending from a tip of the flange parts in the extension direction, a radially inner-facing surface of the at least one protrusion of the bobbin being arranged in contact with a radially outer-facing surface of the at least one protrusion of an adjacent bobbin;
a stator that is formed by integrally molding the plurality of stator cores by a resin, the stator cores being configured such that a gap is formed in a rotational direction of each flange part by bringing the extension-direction tip of the at least one protrusion in the flange part of the bobbin of one stator core into contact, in a rotational direction of an output shaft, with an end part of the flange part of the bobbin of another stator core in the extension direction and being arranged in an annular shape about an axial direction of the output shaft; and
one or more of rotors that are in a planar-faced configuration with the side surfaces of the end part of the teeth iron core, interposed by a predetermined air gap.

2. The axial-air-gap motor according to claim 1, wherein the bobbin includes at least the one protrusion on each of both the flange parts extending in the rotational direction of the output shaft, and
a distance from a side face of the one protrusion in the axial direction of the output shaft to a shaft core is as approximately equal as a distance from a side face of the other protrusion in a direction opposing the axial direction of the output shaft to the shaft core.

3. The axial-air-gap motor according to claim 2, wherein the bobbin includes at least the two protrusions on each of the flange parts extending in the rotational direction of the output shaft, and
a distance from a side face of each of at least the two protrusions of the one flange part in the axial direction of the output shaft to the shaft core is as approximately equal as a distance from a side face of at least the two protrusions of the other flange part in a direction opposing the axial direction of the output shaft to the shaft core.

4. The axial-air-gap motor according to claim 1, wherein the bobbin includes at least the two protrusions on each of both the flange parts extending in the rotational direction of the output shaft, and
at least one of the two protrusions on each of both the end parts is positioned in the vicinity of a shaft core-side end part in each of both the end parts, and the other one is positioned in the vicinity of a radial-outside end part in each of both the end parts.

5. The axial-air-gap motor according to claim 1, wherein the bobbin includes a concave part having a width as approximately equal as an axial-direction width of the protrusion and a depth shorter than an extension-direction length of the protrusion on the opposing flange part in the rotational direction of the output shaft, and
a distance of the protrusion from a shaft core of the output shaft is as approximately equal as a distance of the concave part from the shaft core of the output shaft.

6. The axial-air-gap motor according to claim 1, wherein the bobbin includes at least the one protrusion on each of the flange parts opposing in the rotational direction of the output shaft,
a distance of the one flange part protrusion from a shaft core of the output shaft is as approximately equal as a distance of the other flange part protrusion from the shaft core of the output shaft, and the stator causes an extension-direction tip of each of the protrusions to be brought into contact with an extension-direction end part of the protrusion of the other stator core along the rotational direction of the output shaft.

7. The axial-air-gap motor according to claim 6, wherein the bobbin includes a convex part extending in the rotational direction in a tip of the one flange part protrusion, and a concave part in a tip of the other flange part protrusion, the concave part having a depth as approximately equal as a radial width of the convex part and as approximately equal as or longer than a rotational direction length of the convex part.

8. A bobbin for a motor stator in which teeth iron cores each having a side cross-sectional surface in an approximate trapezoidal shape are arranged in an annular shape by opposing two oblique sides of the teeth iron core to each other and pointing an upper base side thereof at the center, including
an inner cylindrical part having an inner diameter as approximately equal as an outer peripheral shape of the teeth iron core for inserting the teeth iron core therein,
an outer cylindrical part around which a coil is wound along and on an outer periphery of the teeth iron core, and
a flange part extending by a predetermined length in an opposing direction of the two oblique sides from a peripheral surface of the outer cylindrical part, wherein the flange part includes at least one protrusion having a rectangular shape further extending from the extension direction of the flange part, wherein an extension-direction tip of the at least one protrusion is brought into contact with an extension-direction tip of at least one protrusion of an adjacent bobbin so as to form a gap in a rotational direction between the flange part of the bobbin and a flange part of the other bobbin, a radially inner-facing surface of the at least one protrusion of the bobbin being arranged in contact with a radially outer-facing surface of the at least one protrusion of the adjacent bobbin.

9. An axial-air-gap motor comprising:
a plurality of stator cores each including:
a teeth iron core having a shape of a pillar,
a bobbin covering at least a vicinity of both end parts of the outer periphery of the teeth iron core,
flange parts provided in a vicinity of the portions of the bobbin that covers both the end parts of the outer periphery of the teeth iron core so as to extend by a predetermined length in a direction perpendicular to the outer periphery of the teeth iron core, and
at least one protrusion having a rectangular shape further extending from a tip of the flange part in the extension direction, a radially inner-facing surface of the at least one protrusion of the bobbin being arranged in contact with a radially outer-facing surface of the at least one protrusion of an adjacent bobbin;
a stator in which the plurality of stator cores are integrally molded by a resin, the stator cores being configured such that flange parts of bobbins of adjacent stator cores have an air gap therebetween, and the extension-direction tip of the at least one protrusion in the flange part of the bobbin of one stator core is brought into contact, in a rotational direction of an output shaft, with the extension-direction tip of the at least one protrusion in the flange part of the bobbin of another stator core and being arranged in an annular shape about an axial direction of the output shaft; and
one or more of rotors that are in a planar-faced configuration with the side surfaces of the end part of the teeth iron core, interposed by a predetermined air gap.

10. The axial-air-gap motor according to claim 9, wherein the bobbin includes a convex part extending in the rotational direction in a tip of the one flange part protrusion, and a concave part in a tip of the other flange part protrusion, the concave part having a depth as approximately equal as a radial width of the convex part and as approximately equal as or longer than a rotational direction length of the convex part.

* * * * *